US012456105B2

United States Patent
Rodriguez et al.

(10) Patent No.: US 12,456,105 B2
(45) Date of Patent: Oct. 28, 2025

(54) POINT-OF-SALE (POS) DEVICE CONFIGURATION SYSTEM

(71) Applicant: Toshiba Global Commerce Solutions Holdings Corporation, Tokyo (JP)

(72) Inventors: Adrian Rodriguez, Durham, NC (US); Zachary McCain Darden, Apex, NC (US); Lucas Blanck, Cary, NC (US); Jonathan Waite, Apex, NC (US)

(73) Assignee: TOSHIBA GLOBAL COMMERCE SOLUTIONS HOLDINGS CORPORATION, Tokyo (JP)

( * ) Notice: Subject to any disclaimer, the term of this patent is extended or adjusted under 35 U.S.C. 154(b) by 544 days.

(21) Appl. No.: 17/705,933

(22) Filed: Mar. 28, 2022

(65) Prior Publication Data
US 2023/0306397 A1 Sep. 28, 2023

(51) Int. Cl.
*G06Q 20/20* (2012.01)
*G07G 1/00* (2006.01)
*H04L 67/00* (2022.01)

(52) U.S. Cl.
CPC .................................. *G06Q 20/20* (2013.01)

(58) Field of Classification Search
CPC ......... G06Q 20/20; H04L 41/22; H04L 67/34; G06F 9/455; G07G 1/0009
See application file for complete search history.

(56) References Cited

U.S. PATENT DOCUMENTS

| 8,448,170 | B2 | 5/2013 | Wipfel et al. |
| 2012/0331148 | A1 | 12/2012 | Rao |
| 2016/0124742 | A1 | 5/2016 | Rangasamy et al. |
| 2020/0310394 | A1* | 10/2020 | Wouhaybi ........... H04L 67/1051 |
| 2020/0348913 | A1* | 11/2020 | Cerar ..................... G06F 8/34 |
| 2022/0383284 | A1* | 12/2022 | Rastogi ............... G06Q 20/202 |

* cited by examiner

*Primary Examiner* — Peter Ludwig
*Assistant Examiner* — Reva R Moore
(74) *Attorney, Agent, or Firm* — COATS & BENNETT, PLLC

(57) ABSTRACT

A system allows users to dynamically manipulate an orchestration flow to eliminate deprecated functionality and/or to include new or modified functionality. The system provides multiple layers configured to combine the functionality provided by a graphical user interface (GUI) with fixed software code associated with the orchestration flow. With the system, users can quickly and easily configure and/or re-configure various Point-Of-Sale (POS) devices to execute the functions of the modified orchestration flow.

17 Claims, 6 Drawing Sheets

PROCESSING CIRCUITRY
132

COMMUNICATIONS UNIT/MODULE
140

INFORMATION RETRIEVING UNIT/MODULE
142

CODE MODIFICATION UNIT/MODULE
144

TARGET DEVICE CONFIGURATION UNIT/MODULE
146

FIG. 6

POINT-OF-SALE (POS) DEVICE CONFIGURATION SYSTEM

BACKGROUND

There are many different acronyms used in the field of computing. One such acronym is WYSIWYG, which stands for "What-You-See-Is-What-You-Get." WYSIWYG is a technology that allows users to create a finished product (e.g., a document, a web page, a software system, etc.) using a variety of predefined objects. Each predefined object typically represents a different function or set of functions and visually resembles the appearance of the object in the finished product.

Generally, a user creates the finished product by interacting with a graphical WYSIWYG editor. For example, most WYSIWYG editors provide the user with a library of predefined objects, each represented by a graphical icon. The user can "drag-n-drop" the icon representing a given object onto a work area of the graphical WYSIWYG editor. Code associated with that WYSIWYG object is then inserted into a program defining the finished product. WYSIWYG technology is beneficial because it allows developers to concentrate on how the finished product should function without having to worry about the details of that functionality.

BRIEF DESCRIPTION OF THE DRAWINGS

FIG. 6 is a schematic block diagram of a computer program product configured to configure a POS device according to one embodiment of the present disclosure.

DETAILED DESCRIPTION

"What-You-See-Is-What-You-Get" (WYSIWYG) editors have been in use for some time. As previously stated, WYSIWYG editors allow users to create a finished product, such as an orchestration flow, for example, using any number of predefined objects. Each object may represent a function or set of functions in the orchestration flow and graphically resembles the appearance of the object in the orchestration flow. WYSIWYG editors are beneficial, as they shield the user from having to worry about the underlying coding defining the function. However, the orchestration flows they produce are also notoriously cumbersome to use and difficult to maintain. This is especially true for end users that want or need to modify their orchestration flows from time-to-time.

Embodiments of the present disclosure, however, address such issues by providing a system that allows end users associated with a retail setting to dynamically manipulate their retail-related orchestration flows to eliminate deprecated functionality and/or to include new or modified functionality. To accomplish this, the present embodiments provide a multi-layer system that merges the functionality of a graphical user interface (GUI) used by the end user with highly stable and easy-to-maintain fixed software code associated with the orchestration flow. Using the disclosed system, end users are quickly and easily able to configure and re-configure their Point-of-Sale (POS) devices to execute the functions of a desired, modified orchestration flow.

Figure 1:
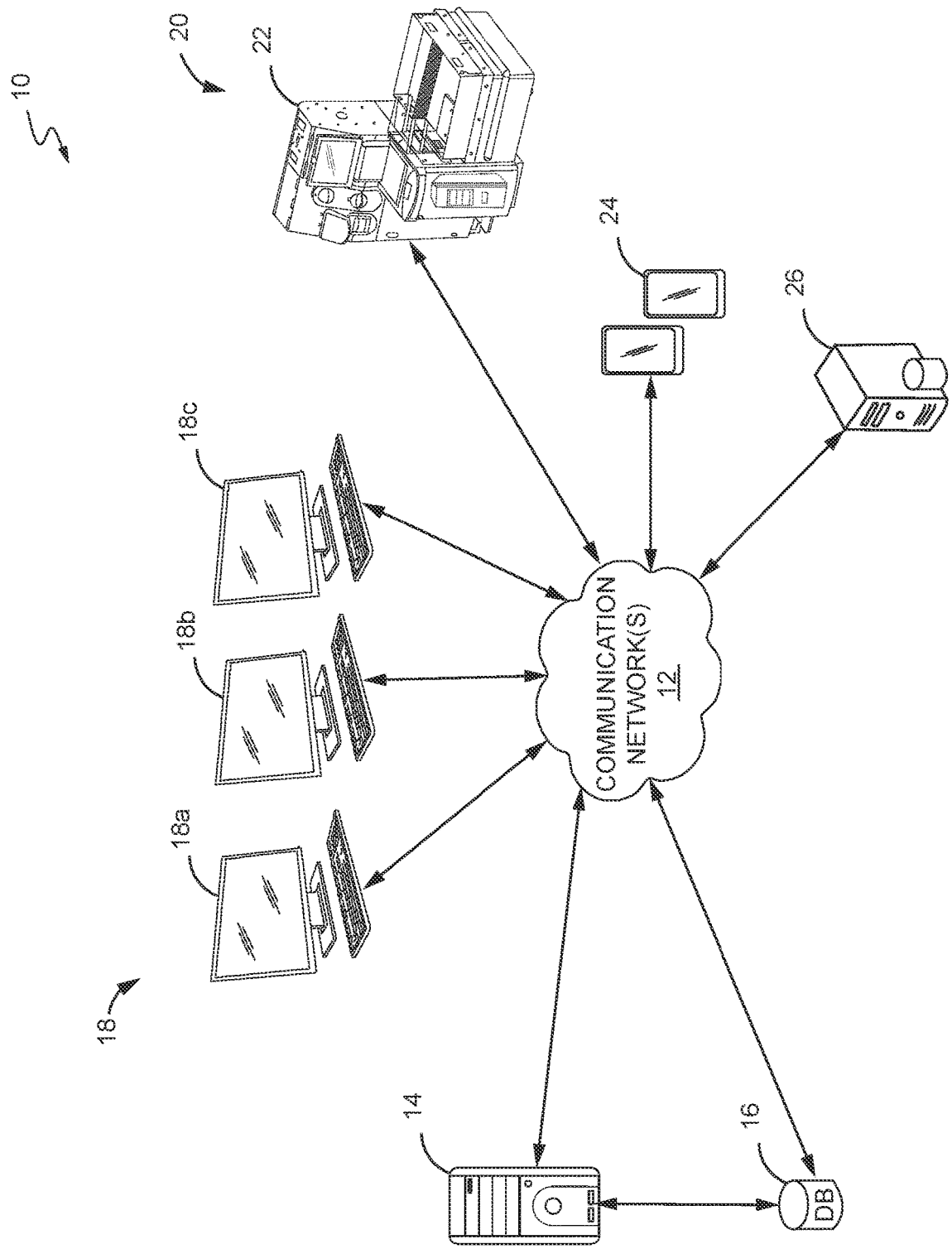
FIG. 1 illustrates a communication system for a retail environment configured according to one aspect of the present disclosure.

Turning now to the drawings, FIG. 1 is a functional block diagram illustrating a POS configuration system 10 for a retail environment according to one aspect of the present disclosure. As seen in FIG. 1, POS configuration system 10 comprises one or more communication network(s) 12 communicatively connecting a back-end application server (AS) 14, a database (DB) 16, one or more workstations (WSs) 18, one or more POS devices 20, such as Self-Checkout (SCO) station 22 and mobile device 24, and an AS 26 associated with a retail store.

Communication network(s) 12 may comprise one or more public or private IP networks that communicate packets of data between the devices to which it connects. Such communication network(s) 12 and the methods they use to carry packet data are well-known in the art; however, for completeness, communication network(s) 12 may comprise the Internet and/or any other public and private networks capable of communicating data packets using the well-understood Transmission Control Part (TCP)/Internet Protocol (IP). In some embodiments, communication network(s) 12 represents the "cloud." In these cases, one or more of the devices connected to it may be in the "cloud."

Application Server (AS) 14 comprises one or more computers configured to control software code associated with an orchestration flow utilized by various retail environments (e.g., one or more retail stores). The code may comprise, for example, different code modules, each of which defines a function or set of functions executed by the POS devices 20 as part of an orchestration flow, and is provided by a developer (or a development team). According to the present embodiments, AS 14 is configured to store the code modules in DB 16 and to load the code modules for execution by POS devices 20. In some embodiments, the code modules associated with an orchestration flow can also be stored in AS 26 associated with a retail store.

User workstations (WSs) 18a, 18b, 18c (collectively referred to herein as WS 18) may comprise one or more computers used by the end users of a retail store to manage the orchestration flow. Such end users may include, but are not limited to, store employees, store managers, and third-party entities that help the retail stores manage their orchestration flows. According to the present embodiments, each of WS 18a, 18b, and 18c may belong to, or be associated with, a single retail store. However, the present disclosure is not so limited. In some embodiments, fewer than all the WSs 18 are associated with a first retail store, while the remainder of the WSs 18 are associated with one or more different retail stores. Regardless of the number of WSs 18, however, each WS 18 is configured according to the present embodiments to output a WYSIWYG graphical user interface (GUI) to a display for a respective end user. The GUIs allow the end users to dynamically manage the functions executed as part of the orchestration flow.

The POS devices 20 include, but are not limited to, one or more SCO stations 22 and one or more mobile device(s) 24. Other devices used as a POS device, and/or in support of POS functions, may not be specifically identified herein but can also be included as a POS device 20. Regardless of their particular type or function, however, POS devices 20 are configured to execute the orchestration tasks that comprise the orchestration flow. Each orchestration task may correspond to a function or set of functions defined by one or more of the code modules controlled by AS 14. By way of example only, an orchestration flow may comprise one or more orchestration tasks related to a manager override operation. Other example orchestration flows comprise those related to order processing, printing, and the handling at a POS device 20 of applicable taxes associated with that processing. Regardless of the orchestration flow functionality, however, each of the one or more orchestration tasks comprising the orchestration flow may correspond to one or more code modules containing the program code for executing that task. Further, according to the present embodiments, some or all the POS devices 20 may be selectively or collectively configured to execute those orchestration tasks to carry out the orchestration flow.

Figure 2:
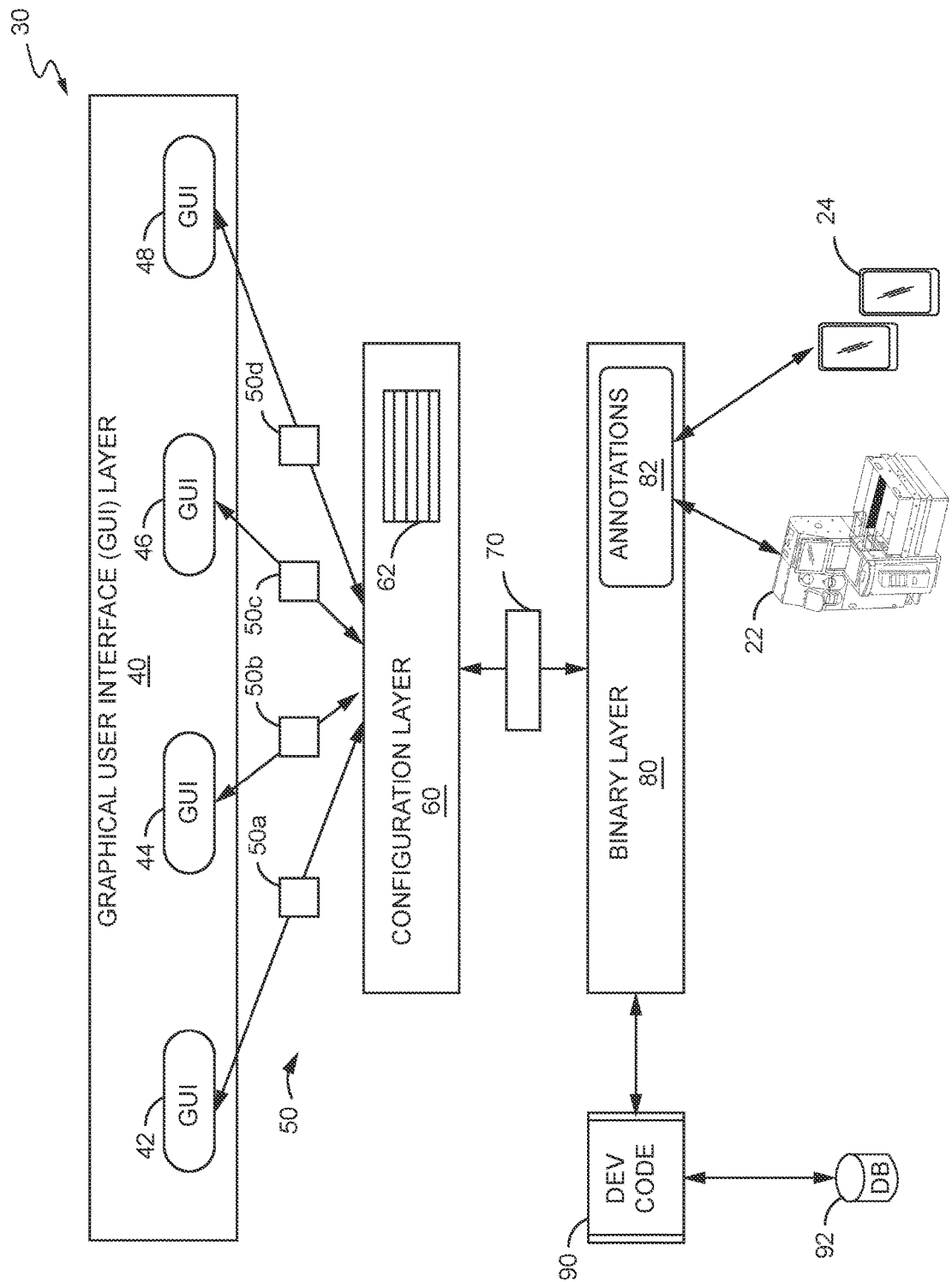
FIG. 2 illustrates a logical structure of a Point-Of-Sale (POS) configuration system according to one aspect of the present disclosure.

FIG. 2 is a functional block diagram illustrating a logical structure 30 of a POS configuration system 10 according to one aspect of the present disclosure. As seen in FIG. 2, logical structure 30 comprises a plurality of different layers—a GUI layer 40, a configuration layer 60, and a binary (or byte) layer 80. Each layer is comprised of software code executed on a physical device for performing their corresponding functions.

The GUI layer 40 is configured to provide one or more end users with a corresponding WYSIWYG GUI 42, 44, 46, 48. Each GUI 42, 44, 46, 48 is a graphical interface in which an end user can use to create and/or modify an orchestration flow. Typically, each GUI 42, 44, 46, 48 is displayed on the display of a corresponding WS 18. In one embodiment, all the GUIs 42, 44, 46, 48 are associated with a single retail store. In other embodiments, however, one or more of the GUIs 42, 44, 46, 48 are associated with a first retail store while one or more of the remaining GUIs 42, 44, 46, 48 are associated with a second retail store.

In operation, end users create and/or modify an orchestration flow using GUI layer 40. In one aspect, for example, an end user may use a corresponding GUI 42, 44, 46, 48, to add, modify, or delete an orchestration task to/from an orchestration flow. For example, the end user may identify a particular orchestration flow and/or task by selecting the flow or task a drop-down list provided by GUI 42, 44, 46, 48. Once selected, the user then can add, delete, or modify information associated with that flow and/or task. Such information may include, for example, one or more parameters used by the orchestration task, values for those one or more parameters, and the like.

Additionally, in one aspect, the user may also provide one or more indicators associated with the code module for performing the orchestration task. As described in more detail below, indicators are identifiers (e.g., labels) that are mapped by system 10 to code annotations in the code modules. As described in more detail below, the indicators allow the configuration layer 60 to identify and locate a particular function or set of functions within a code module so that it can be modified according to the information provided by the user.

In one embodiment, for example, the user may manually specify an indicator in a text field of the GUI. In another embodiment, however, the user may select an indicator from a drop-down list provided by the GUI. In some aspects, the GUI is configured to autonomously determine the indicator for the user based on information provided by the user.

Regardless, each GUI 42, 44, 46, 48 in GUI layer 40 generates a corresponding information file 50*a*, 50*b*, 50*c*, 50*d* (collectively herein, information files 50) comprising the information provided by the user and the GUI. The information files 50 are then sent to configuration layer 60 and used to modify the identified orchestration flow. The information files 50 may be formatted in any matter needed or desired. However, in one embodiment, the information files 50 are formatted according to an extended Markup Language (XML) format. After receiving the information files 50*a*, 50*b*, 50*c*, 50*d* from GUI layer 40, configuration layer 60 generates a corresponding control file 70 based on the information in those files to send to the binary layer 80. That is, configuration layer 60 generates a control file 70 for each information file 50*a*, 50*b*, 50*c*, 50*d* it receives from GUI layer 40

Using the data in the control file 70, the binary layer 80 retrieves the appropriate code module 90 from the developer code repository DB 92 and returns the code module 90 to the configuration layer 60. Upon receipt of code module 90, configuration layer 60 modifies the program code in the code module 90 and updates a configuration table 62 to include a link to the modified code module 90. That is, the indicators provided at the GUI level 40 map to the code annotations 82 in a given code module 90. The particular code sections indicated by the code annotations are then modified according to the information contained in the corresponding information file 50*a*, 50*b*, 50*c*, 50*d*.

Configuration layer 60 then sends the modified code module 90 to binary layer 80 where it is processed (e.g., compiled) for execution by one or more POS devices 20, such as SCO stations 22 and mobile devices 24.

Figure 3:
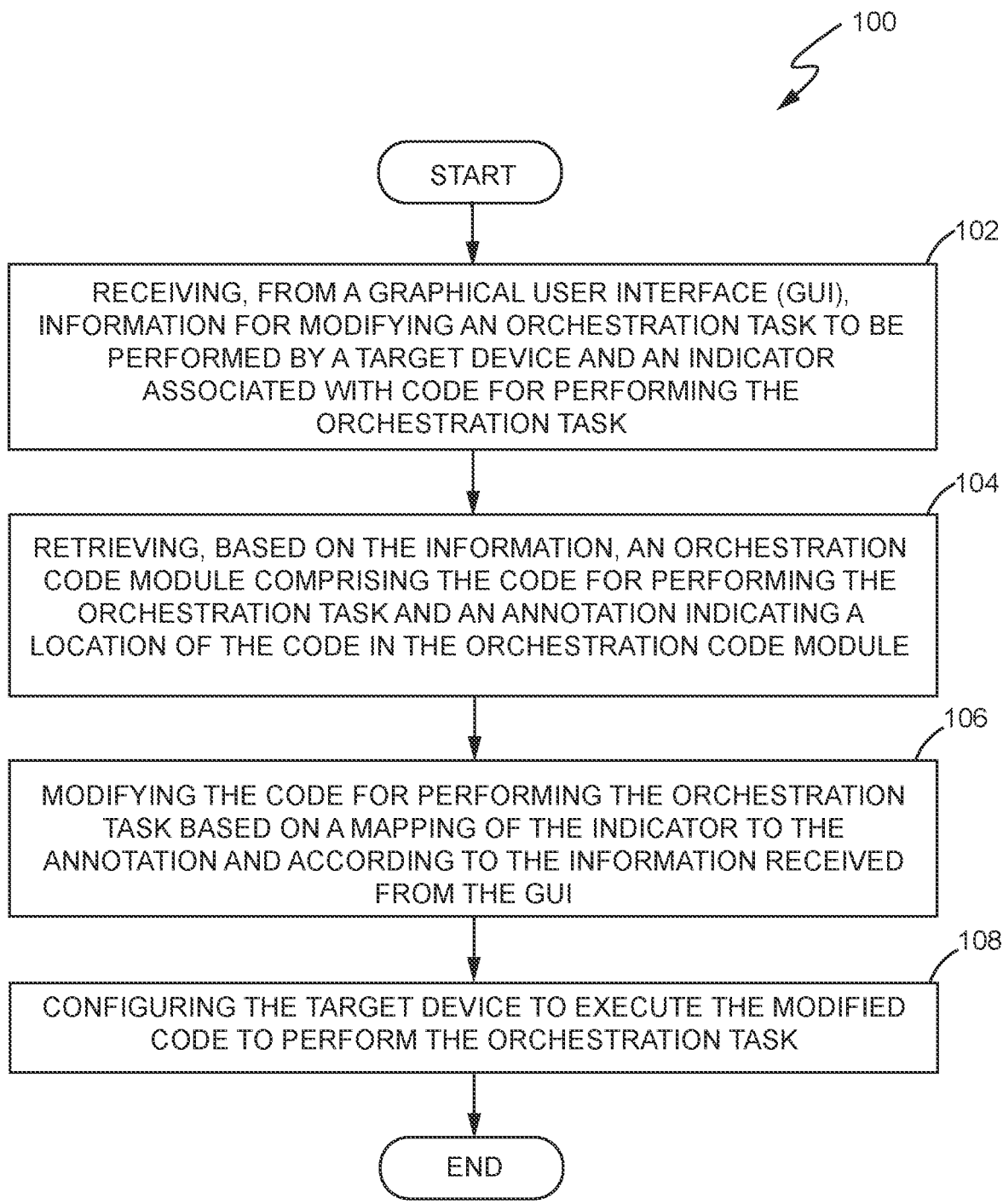
FIG. 3 is a flow diagram illustrating a method for configuring a POS device according to one embodiment of the present disclosure.

FIG. 3 is a flow diagram illustrating a method 100 for configuring a target device, such as a POS device 20, for example, to perform an orchestration task according to one embodiment of the present disclosure. The method 100 of FIG. 3 is performed by a computing device (e.g., AS 14 and/or AS 26) implementing the configuration layer 60.

As seen in FIG. 3, configuration layer 60 receives, from a GUI (e.g., GUI 42) in GUI layer 30, information (e.g., an information file 50*a*) for modifying an orchestration task to be performed by a target device, such as one or more of the POS devices 20. Additionally, configuration layer 60 also receives an indicator associated with the code for performing the orchestration task (box 102). As stated above, the indicator may comprise a label, for example, that maps to a section of code in a code module 90.

Then, based on the information in the received information file 50*a*, configuration layer 60 retrieves a code module 90 comprising the code for performing the orchestration task. As stated above, the code module 90 includes a code annotation indicating the location of the section of code to be modified (box 104). So retrieved, configuration layer 60 modifies the section of code marked by the code annotation (box 106). Thus, the code module 90 is modified based on the mapping of the indicator to the code annotation and according to the information file 50*a* received from the GUI layer 40. Once modified, configuration layer 60 configures the target device to execute the modified code module to perform the orchestration task (box 108).

Figure 4:
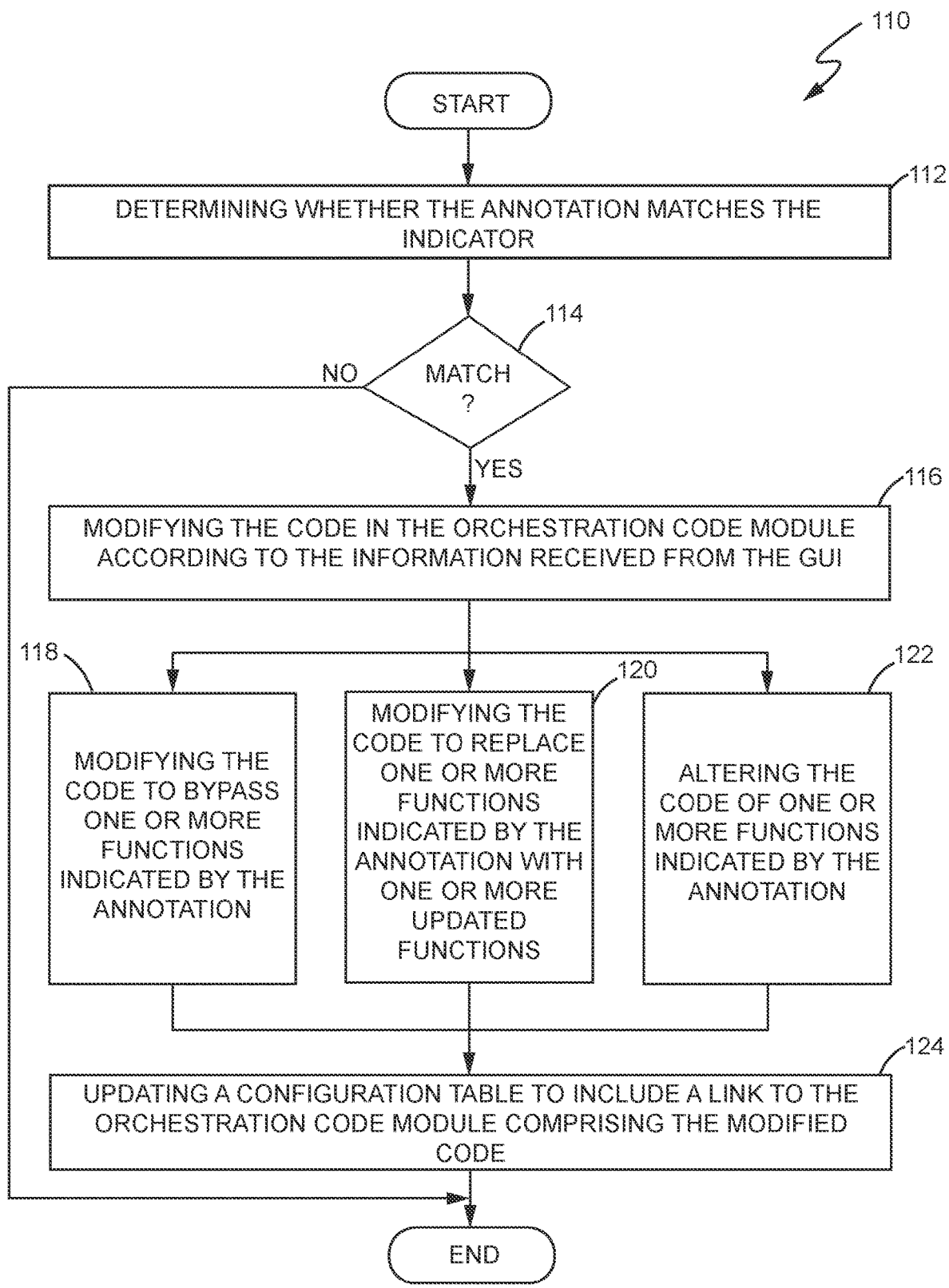
FIG. 4 is a flow diagram illustrating a method for modifying the code executed by a POS device according to one aspect of the present disclosure.

FIG. 4 is a flow diagram illustrating a method 110 for modifying the code module 90 executed by a target device, such as one or more of the POS devices 20, according to one aspect of the present disclosure. Method 110 is performed by the computing device, such as AS 14 or AS 26, that implements configuration layer 60. Method 110 also assumes that configuration layer 60 has received the information files 50 and retrieved the appropriate code module 90, as previously described.

In more detail, in response to receiving information file 50*a*, for example, configuration layer 60 first determines whether any of the annotations in the code module 90 match the indicator received in the information file 50*a* (box 112). If no code annotations match the indicator (box 114), the process ends. If the indicator does match a code annotation however (box 114), configuration layer 60 modifies the section of code corresponding to the code annotation in accordance with the data received in information file 50*a* (box 116). For example, in one embodiment, configuration layer 60 parses the code module 90 until it locates the code annotation matching the indicator. So identified, configuration layer 60 modifies the section code identified by the code annotation.

By way of example only, configuration layer 60 may modify the section of code associated with the code annotation to bypass one or more functions (box 118). To bypass the one or more functions, configuration layer 60 may remove some or all of the code associated with the code annotation, or it may alter that code to comment out the one or more functions. In one embodiment, configuration layer 60 may modify the section of code associated with the code annotation so that the code is selectively executed by certain target devices under specified conditions. Such conditions may be specified by the user in the information file 50*a*.

In another example, configuration layer 60 may modify the code module 90 to replace one or more of the functions associated with the code annotation with one or more updated functions (box 120). In these aspects, the updated functions would have already been coded and tested by developers, and then stored, for example, in the code repository of DB 16. Configuration layer 60 would retrieve the updated function code when it retrieved the code module 90, locate the code annotation in the code module 90, and then replace the code associated with the code annotation with the updated function code.

In another aspect, configuration layer 60 is configured to alter the existing code of one or more functions associated with the code annotation according to the data received in the information file 50*a* (box 122). In this aspect, configuration layer 60 may add/delete/modify various parameters, parameter values, and/or a section of the code comprising a function.

Once the code module 90 has been modified, configuration layer 60 updates the configuration table 62 to include a link to the code module 90 that comprises the modified code (box 124).

Figure 5:
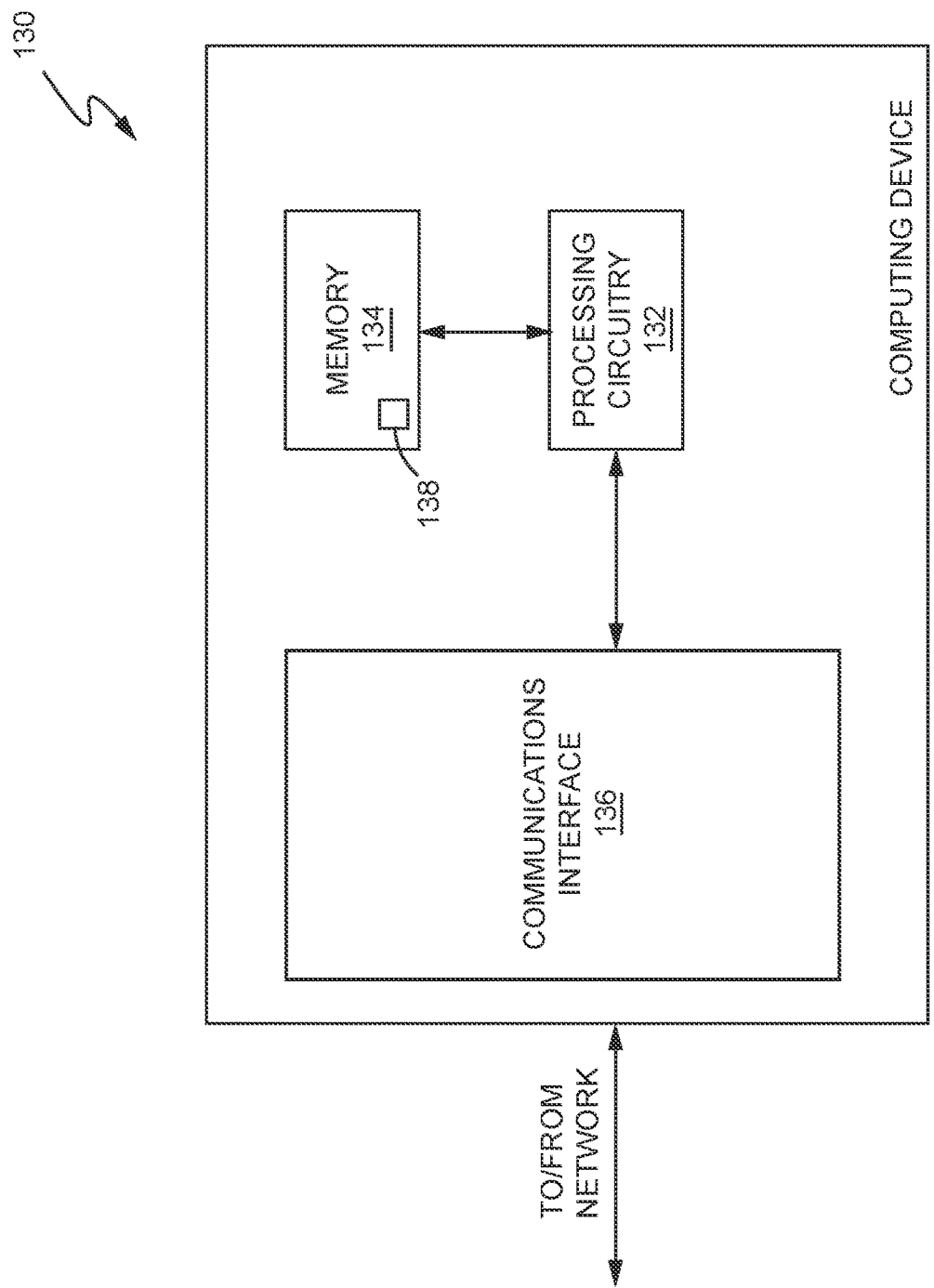
FIG. 5 is a block diagram illustrating some components of a computing device configured according to one aspect of the present disclosure.

FIG. 5 is a block diagram illustrating some components of a computing device 130 configured according to one aspect of the present disclosure. Computing device 130 may be, for example, AS 14 or AS 26, and implements the configuration layer 60. Those of ordinary skill in the art will readily appreciate that only some of the components are illustrated in FIG. 5 and that computing device 130 may comprise other components not specifically illustrated herein.

As seen in FIG. 5, computing device 130 comprises processing circuitry 132, memory 134, and communications interface circuitry 136. Additionally, a control program 138 containing the code for implementing configuration layer 60 may be stored in memory 134. According to one or more embodiments of the present disclosure, processing circuitry 132 communicatively connects the memory 134 and the communications interface circuitry 136 via one or more buses. Processing circuitry 132 may comprise any sequential state machine capable of executing machine instructions stored as a machine-readable computer program (e.g., control program 138 stored in memory 134), such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above.

Memory 134 may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like. As seen in FIG. 5, memory 134 stores the control program 138 that executes on computing device 130 to implement the functions of the configuration layer 60, as previously described.

The communications interface circuitry 136 comprises circuitry configured to allow the computing device 130 to communicate data and information with one or more remote devices. By way of example only, via communications interface circuitry 136 and network 12, computing device 130 may communicate information and data with the other AS servers (e.g., AS 14 and/or AS 26), as well as with the GUIs 42, 44, 46, 48 on one or more of the WSs 18. To that end, communications interface circuitry 136 may be configured to communicate using any of a wide variety of protocols including, but not limited to, WiFi, BLUETOOTH, TCP/IP, USB and the like.

According to the embodiments of the present disclosure, processing circuitry 132 is configured to execute the code and instructions contained in the control program 138 to implement the functions of the configuration layer 60, as previously described. As such, processing circuitry 132 is configured, according to the present disclosure, to receive from a GUI 40, information for modifying an orchestration task to be performed by POS device 20, and an indicator associated with code for performing the orchestration task. Processing circuitry 132 is also configured to retrieve, based on the information, an orchestration code module comprising the code for performing the orchestration task and an annotation indicating a location of the code in the orchestration code module. So located, processing circuitry 132 is configured to modify the code for performing the orchestration task based on a mapping of the indicator to the annotation and according to the information received from the GUIs 42, 44, 46, 48, and configure the POS device 20 to execute the modified code to perform the orchestration task.

FIG. 6 illustrates an embodiment of the processing circuitry 132 comprising physical hardware units and software modules for implementing the functionality associated with configuration layer 60. In this embodiment, processing circuitry 132 comprises a communications unit/module 140, an information retrieving unit/module 142, a code modification unit/module 144, and a target device configuration unit/module 146.

The communications unit/module 140 comprises the hardware and/or software code that, when executed by processing circuitry 132, configures the computing device 130 to communicate data and other information with one or more of the other devices communicatively connected to network 12. Such data and information comprises, for example, the information files 50 generated by the GUIs 42, 44, 46, 48.

The information retrieving unit/module 142 comprises the hardware and/or software code that, when executed by processing circuitry 132, configures the computing device 130 to process the received information files 50 to extract the data and information it needs to retrieve and modify the code module 90.

The code modification module 146 comprises the hardware and/or software code that, when executed by processing circuitry 132, configures the computing device 130 to determine whether a given code module 90 comprises the code subject to the modification, and if so, to modify the code accordingly, as previously described.

The target device configuration unit/module 146 comprises the hardware and/or software code that, when executed by processing circuitry 132, configures the computing device 130 to configure one or more of the POS devices 20 to execute the modified orchestration tasks of the orchestration flow, as previously described above.

The present embodiments may, of course, be carried out in ways other than those specifically set forth herein without departing from essential characteristics of the disclosure. Therefore, the present embodiments are to be considered in all respects as illustrative and not restrictive, and all changes coming within the meaning and equivalency range of the appended claims are intended to be embraced therein.

The invention claimed is:

1. A method for controlling operation of a target device, the method implemented by an application server executing a configuration layer and a binary layer and comprising:
   receiving, by the configuration layer from a graphical user interface (GUI) layer executing on a user device:
      an information file generated by the GUI layer, the information file comprising information for modifying an orchestration task to be performed by a target device; and
      an indicator associated with source code for performing the orchestration task, wherein the indicator identifies a location of the source code within an orchestration code module;
   generating, by the configuration layer and for the binary layer, a control file based on the information file;
   retrieving, by the binary layer and based on data in the control file, the orchestration code module comprising:
      the source code for performing the orchestration task; and
      an annotation indicating the location of the source code in the orchestration code module;
   modifying, by the configuration layer, the source code for performing the orchestration task by:
      identifying the location of the source code in the orchestration code module based on a mapping of the indicator to the annotation, wherein the mapping indicates that the indicator matches the annotation;
      modifying the source code at the location according to the information received from the GUI layer; and
      updating a configuration table to include a link to the orchestration code module comprising the modified source code
   configuring, by the binary layer, processing circuitry of the target device to execute the modified source code to perform the orchestration task, wherein configuring the processing circuitry of the target device comprises compiling the orchestration code module comprising the modified source code, wherein compiling the orchestration code module comprises transforming the modified source code into machine-readable code executable by the processing circuitry of the target device.

2. The method of claim 1 wherein modifying the source code at the location comprises modifying the source code identified by the annotation.

3. The method of claim 2 wherein modifying the source code for performing the orchestration task comprises modifying the source code to bypass one or more functions indicated by the annotation.

4. The method of claim 2 wherein modifying the source code for performing the orchestration task comprises modifying the source code to replace one or more functions indicated by the annotation with one or more updated functions.

5. The method of claim 2 wherein modifying the source code for performing the orchestration task comprises altering the source code of one or more functions indicated by the annotation.

6. The method of claim 1 wherein the information from the GUI layer comprises one or more attribute/value pairs associated with the orchestration task to be performed by a target device, and wherein the link to the orchestration code module includes the one or more attribute/value pairs.

7. The method of claim 1 wherein the target device comprises a Point-of-Sale (POS) device of a retail store.

8. A computing device for controlling operation of a target device, the computing device executing a configuration layer and a binary layer and comprising:
   memory circuitry configured to store a control application; and
   processing circuitry operatively connected to the memory circuitry and configured to execute the control application to:
      receive, by the configuration layer from a graphical user interface (GUI) layer executing on a user device:
         an information file generated by the GUI layer, the information file comprising information for modifying an orchestration task to be performed by a target device; and
         an indicator associated with source code for performing the orchestration task, wherein the indicator identifies a location of the source code within an orchestration code module;
      generate, by the configuration layer and for the binary layer, a control file based on the information file;
      retrieve, by the binary layer and based on data in the control file, the orchestration code module comprising:
         the source code for performing the orchestration task; and
         an annotation indicating the location of the source code in the orchestration code module;
      modify, by the configuration layer, the source code for performing the orchestration task by
         identifying the location of the source code in the orchestration code module based on a mapping of the indicator to the annotation, wherein the mapping indicates that the indicator matches the annotation;
         modifying the source code at the location according to the information received from the GUI layer; and
         updating a configuration table to include a link to the orchestration code module comprising the modified source code;

configure, by the binary layer, processing circuitry of the target device to execute the modified source code to perform the orchestration task by compiling the orchestration code module comprising the modified source code for execution by the processing circuitry of the target device, wherein compiling the orchestration code module comprises transforming the modified source code into machine-readable code executable by the processing circuitry of the target device.

9. The computing device of claim 8 wherein the processing circuitry is further configured to determine that the annotation matches the indicator.

10. The computing device of claim 9 wherein the processing circuitry is configured to modify the source code to bypass one or more functions indicated by the annotation.

11. The computing device of claim 9 wherein the processing circuitry is configured to replace one or more functions indicated by the annotation with one or more updated functions.

12. The computing device of claim 9 wherein the processing circuitry is configured to alter the source code of one or more functions indicated by the annotation.

13. The computing device of claim 8 wherein the information received from the GUI layer comprises one or more attribute/value pairs associated with the orchestration task to be performed by the target device, and wherein the link to the orchestration code module includes the one or more attribute/value pairs.

14. The computing device of claim 8 wherein the source code for performing the orchestration task is implemented by a plurality of target devices in first and second geographical regions, and wherein the processing circuitry is configured to modify the source code such that only the target devices in the first geographical region implement the modified code.

15. The computing device of claim 8 wherein the source code for performing the orchestration task is implemented by a plurality of target devices in first and second retail stores, and wherein the processing circuitry is configured to modify the source code such that only the target devices in the first retail store implement the modified source code.

16. The computing device of claim 8 wherein the computing device is associated with a retail environment.

17. A non-transitory computer readable medium storing instructions thereon that, when executed by processing circuitry of a computing device executing a configuration layer and a binary layer, configures the processing circuitry to:
receive, by the configuration layer from a graphical user interface (GUI) layer executing on a user device:
an information file generated by the GUI layer, the information file comprising information for modifying an orchestration task to be performed by a target device; and
an indicator associated with source code for performing the orchestration task, wherein the indicator identifies a location of the source code within an orchestration code module;
generate, by the configuration layer and for the binary layer, a control file based on the information file;
retrieve, by the binary layer and based on data in the control file, an orchestration code module comprising:
the source code for performing the orchestration task; and
an annotation indicating a location of the source code in the orchestration code module;
modify, by the configuration layer, the source code for performing the orchestration task by:
identifying the location of the source code in the orchestration code module based on a mapping of the indicator to the annotation, wherein the mapping indicates that the indicator matches the annotation;
modifying the source code at the location according to the information received from the GUI layer; and
updating a configuration table to include a link to the orchestration code module comprising the modified source code;
configure, by the binary layer, processing circuitry of the target device to execute the modified source code to perform the orchestration task by compiling the orchestration code module comprising the modified source code for execution by the processing circuitry of the target device, wherein compiling the orchestration code module comprises transforming the modified source code into machine-readable code executable by the processing circuitry of the target device.

\* \* \* \* \*